(12) United States Patent
Jiang et al.

(10) Patent No.: US 8,937,892 B2
(45) Date of Patent: Jan. 20, 2015

(54) METHOD AND DEVICE FOR SCHEDULING DOWNLINK SUBFRAMES

(75) Inventors: Dajie Jiang, Beijing (CN); Guangyi Liu, Beijing (CN); Yong Zhang, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 177 days.

(21) Appl. No.: 13/576,628

(22) PCT Filed: Jan. 31, 2011

(86) PCT No.: PCT/CN2011/000187
§ 371 (c)(1),
(2), (4) Date: Aug. 1, 2012

(87) PCT Pub. No.: WO2011/095061
PCT Pub. Date: Aug. 11, 2011

(65) Prior Publication Data
US 2012/0294210 A1   Nov. 22, 2012

(30) Foreign Application Priority Data

Feb. 2, 2010 (CN) .......................... 2010 1 0105029
Feb. 2, 2010 (CN) .......................... 2010 1 0105036

(51) Int. Cl.
H04L 12/26 (2006.01)
H04J 1/16 (2006.01)
G08C 15/00 (2006.01)
G06F 11/00 (2006.01)
G01R 31/08 (2006.01)

(52) U.S. Cl.
USPC ............ 370/280; 370/235; 370/329; 455/550

(58) Field of Classification Search
USPC ................. 370/235–241, 252–278, 280–311, 370/329–336; 455/550
See application file for complete search history.

(56) References Cited

U.S. PATENT DOCUMENTS

| | | | |
|---|---|---|---|
| 7,774,686 B2* | 8/2010 | Ahn et al. ..................... | 714/776 |
| 7,957,329 B2* | 6/2011 | Ahn et al. ..................... | 370/280 |
| 8,254,295 B2* | 8/2012 | Choi et al. .................... | 370/280 |
| 8,284,720 B2* | 10/2012 | Lee et al. ...................... | 370/329 |
| 8,526,309 B2* | 9/2013 | Yamada et al. ............... | 370/235 |
| 8,599,782 B2* | 12/2013 | Chung et al. ................. | 370/329 |
| 8,634,333 B2* | 1/2014 | Sarkar .......................... | 370/278 |
| 2008/0095106 A1* | 4/2008 | Malladi et al. ............... | 370/329 |
| 2008/0227481 A1* | 9/2008 | Naguib et al. ............ | 455/550.1 |
| 2009/0046649 A1* | 2/2009 | Gao et al. ..................... | 370/329 |
| 2010/0165939 A1* | 7/2010 | Lin ............................... | 370/329 |

FOREIGN PATENT DOCUMENTS

| CN | 101282280 A | 10/2008 |
|---|---|---|
| CN | 101399651 A | 4/2009 |
| CN | 101631007 A | 1/2010 |

OTHER PUBLICATIONS

PCT International Search Report dated May 5, 2011, International Application No. PCT/CN2011/000187, 4 pages.

* cited by examiner

Primary Examiner — Man Phan
(74) Attorney, Agent, or Firm — Workman Nydegger

(57) ABSTRACT

A method and device for scheduling downlink subframes are disclosed in the embodiments of the present invention, in which a control section of one subframe schedules data sections of one or more other subframes, making it possible to greatly save an overhead of control signaling to thereby have more resources for transmission of data and improve the performance of a system as compared with traditional scheduling of a single subframe.

16 Claims, 7 Drawing Sheets

--Prior Art--

METHOD AND DEVICE FOR SCHEDULING DOWNLINK SUBFRAMES

RELATED APPLICATIONS

The present application is a U.S. National Stage of International Application No. PCT/CN2011/000187, filed 31 Jan. 2011, designating the United States, and claiming priority to Chinese Patent Application No. 201010105029.8 filed Feb. 2, 2010 and Chinese Patent Application No. 201010105036.8 filed Feb. 2, 2010, and which are herein incorporated by reference in their entirety.

FIELD OF THE INVENTION

The present invention relates to the field of communications and particularly to a method and device for scheduling a downlink sub-frame.

BACKGROUND OF THE INVENTION

In the 3GPP ($3^{rd}$ Generation Partnership Project) LTE (Long Term Evolution) R8 (Release 8) specification, a downlink sub-frame has a length of 1 ms and includes a control section, i.e. PDCCH (Physical Downlink Control Channel) and a data section, i.e. PDSCH (Physical Downlink Shared Channel), and a structure of the downlink sub-frame is as illustrated in FIG. 1.

Particularly the control section, i.e. PDCCH, in the downlink sub-frame schedules the data section of PDSCH in the sub-frame, that is, a frequency-domain resource, a modulation and coding scheme and other control information used for data transmission of the downlink sub-frame are specified in the PDCCH of the sub-frame.

The inventors have identified during making the invention at least the following problem in the prior art:

A drawback of the prior art lies in that a control section of a sub-frame can only schedule a data section of the sub-frame, which may not be very flexible in some special cases.

SUMMARY OF THE INVENTION

Embodiments of the invention provide a method and device for scheduling a downlink sub-frame so that a control section of a sub-frame schedules a data section of one or more other sub-frames, making it possible to greatly save an overhead of control signaling to thereby have more resources for transmission of data and improve the performance of a system as compared with traditional scheduling of a single downlink sub-frame. In order to attain the foregoing object, one aspect of the embodiments of the invention provides a method for scheduling a downlink sub-frame, which particularly includes the steps of:

determining a set of downlink sub-frames to be received at a time by each user equipment.
transmitting one downlink sub-frame to the user equipment, wherein control information of respective downlink sub-frames in the set of downlink sub-frames to be received at a time by the user equipment is carried in a control section of the downlink sub-frame; and
transmitting data to the user equipment in data sections of the respective sub-frames in the set of downlink sub-frames to be received at a time by the user equipment.

Preferably the set of downlink sub-frames includes at least two downlink sub-frames; and transmitting the data to the user equipment in the data sections of the respective sub-frames in the set of downlink sub-frames to be received at a time by the user equipment includes: channel-encoding the same payload to obtain at least two redundancy versions; and transmitting the at least two redundancy versions to the user equipment in data sections of the at least two downlink sub-frames.

Preferably the downlink sub-frame, in which the control information is carried, is a downlink sub-frame other than the least two downlink sub-frames.

Preferably the downlink sub-frame, in which, the control information is carried, is a downlink sub-frame among the least two downlink sub-frames.

Preferably the method is applied in an FDD system, and the least two downlink sub-frames are consecutive downlink sub-frames.

Preferably the method is applied in a TDD system, and the least two downlink sub-frames are inconsecutive downlink sub-frames.

Preferably before the user equipment transmits the at least two redundancy versions, the method further includes:
receiving a measurement result of a cell signal quality by a receiver of the payload; and determining from the received measurement result whether it is necessary to transmit the at least two redundancy versions corresponding to the payload to the receiver.

Preferably the control information of the respective downlink sub-frames in the set of downlink sub-frames to be received at a time by the user equipment is carried in the control section of the downlink sub-frame by:
carrying detailed indicator information, of the data sections of the respective downlink sub-frames in the set of downlink sub-frames to be received at a time by the user equipment, in the control section of the downlink sub-frame.

Preferably the detailed indicator information of the data sections of the respective downlink sub-frames in the set of downlink sub-frames to be received at a time by the user equipment, carried in the control section of the downlink sub-frame, is:
a data section of one downlink sub-frame following the downlink sub-frame;
data sections of a plurality of downlink sub-frames following the downlink sub-frame; or
a data section of the downlink sub-frame itself and a data section of one or more downlink sub-frames following the downlink sub-frame.

Preferably payloads transmitted in the data sections of the respective sub-frames in the set of downlink sub-frames to be received at a time by the user equipment are different from each other.

Preferably after transmitting the downlink sub-frame to the user equipment, the method further includes:
the user equipment receiving the downlink sub-frame and obtaining the control information, of the respective downlink sub-frames in the set of downlink sub-frames to be received at a time by the user equipment, carried in the control section of the downlink sub-frame; and
the user equipment receiving the data in the data sections of the respective downlink sub-frames in the corresponding set of downlink sub-frames according to the control information of the respective downlink sub-frames in the set of downlink sub-frames.

Another aspect of the embodiments of the invention further provides a base station which particularly includes:
a scheduling module configured to determine a set of downlink sub-frames to be received at a time by each user equipment; and a transmitting module connected with the scheduling module and configured to transmit one downlink sub-frame to the user equipment, wherein control information of respective downlink sub-frames in the set of downlink sub-frames, to be received at a time by the user equipment, determined by the scheduling module is carried in a control section of the downlink sub-frame, and to transmit data to the user equipment in data sections of the respective sub-frames in the set of downlink sub-frames to be received at a time by the user equipment.

Preferably the set of downlink sub-frames include at least two downlink sub-frames, and the transmitting module includes:

a first transmitting sub-module configured to transmit to the user equipment the downlink sub-frame, wherein control information of the at least two downlink sub-frames, to be received at a time by the user equipment, determined by the scheduling module is carried in a control section of the downlink sub-frame;

an encoding sub-module configured to channel-encode the same payload to obtain at least two redundancy versions; and a second transmitting sub-module configured to transmit the at least two redundancy versions obtained by the encoding sub-module to the user equipment in data sectors of the at least two downlink sub-frames.

Preferably the downlink sub-frame, in which the control information is carried, is a downlink sub-frame other than the at least two downlink sub-frames.

Preferably the downlink sub-frame, in which, the control information is carried, is a downlink sub-frame among the at least two downlink sub-frames.

Preferably the base station further includes:

a receiving module configured to receive a measurement result of a cell signal quality by a receiver of the payload; and a determining module configured to determine from the measurement result measured by the receiving module whether it is necessary to transmit the at least two redundancy versions corresponding to the payload to the receiver, and when a determination result is positive, to instruct the encoding sub-module to channel-encode the payload.

Preferably the control information of the respective downlink sub-frames in the set of downlink sub-frames to be received at a time by the user equipment is carried in the control section of the downlink sub-frame by:

carrying detailed indicator information, of the data sections of the respective downlink sub-frames in the set of downlink sub-frames to be received at a time by the user equipment, in the control section of the downlink sub-frame.

Preferably the detailed indicator information of the data sections of the respective downlink sub-frames in the set of downlink sub-frames to be received at a time by the user equipment is carried in the control section of the downlink sub-frame by carrying detailed indicator information of:

a data section of one downlink sub-frame following the downlink sub-frame;

data sections of a plurality of downlink sub-frames following the downlink sub-frame; or a data section of the downlink sub-frame itself and a data section of one or more downlink sub-frames following the downlink sub-frame.

Preferably payloads transmitted in the data sections of the respective sub-frames in the set of downlink sub-frames to be received at a time by the user equipment are different from each other.

Another aspect of the embodiments of the invention further provides a user equipment including:

an obtaining module configured to obtains control information, of respective downlink sub-frames in a set of downlink sub-frames to be received at a time by the user equipment, carried in a control section of a received downlink sub-frame transmitted from a base station; and a receiving module connected with the obtaining module and configured to receive the downlink sub-frame transmitted from the base station and to further receive data in data sections of the respective downlink sub-frames in the corresponding set of downlink sub-frames according to the control information, of the respective downlink sub-frames in the set of downlink sub-frames, obtained by the obtaining module.

Another aspect of the embodiments of the invention further provides a signal transmission system including a transmitter and a receiver, wherein the transmitter is configured to channel-encode the same payload to obtain at least two redundancy versions, to transmit the at least two redundancy versions in at least two downlink sub-frames, to schedule the at least two downlink sub-frames in a piece of downlink allocation signaling, and to bear a signal in the at least two downlink sub-frames; and the receiver is configured to receive the at least two downlink sub-frames from the transmitter and to obtain the at least two redundancy versions carried in the at least two downlink sub-frames.

Preferably the receiver is further configured, upon failure to decode the payload according to one redundancy version among the at least two redundancy versions, to decode the payload according to another redundancy version among the at least two redundancy versions.

Preferably the receiver is further configured to measure a cell signal quality to obtain a measurement result and to transmit the measurement result to the transmitter; and the transmitter is further configured, before transmitting the at least two redundancy versions in the at least two downlink sub-frames, to receive the measurement result from the receiver and to determine from the measurement result from the receiver whether it is necessary to transmit the at least two redundancy versions corresponding to the payload to the receiver.

The embodiments of the invention have the following advantages over the prior art:

With the technical solution according to the embodiments of the invention, a control section of one sub-frame schedules a data section of one or more other sub-frames, making it possible to greatly save an overhead of control signaling to thereby have more resources for transmission of data and improve the performance of a system as compared with traditional scheduling of a single downlink sub-frame.

BRIEF DESCRIPTION OF THE DRAWINGS

In order to make the technical solution of the invention or in the prior art more apparent, the drawings to be used in a description of the invention or the prior art will be briefly introduced below, and apparently the drawings in the following description are merely illustrative of some embodiments of the invention, and those ordinarily skilled in the art can further derive other drawings from these drawings without any inventive effort.

DETAILED DESCRIPTION OF THE EMBODIMENTS

In order to address the problem present in the prior art, an embodiment of the invention proposes a method for scheduling a downlink sub-frame with such an underlying idea that a control section of a downlink sub-frame can schedule a data sections of a plurality of downlink sub-frames, where payloads transmitted in the respective downlink sub-frames may be the same or may be different from each other. For example, a number N (N>=2) of consecutive downlink sub-frames are bundled in an FDD (Frequency Division Duplex) mode or a number N (N>=2) of inconsecutive downlink sub-frames are bundled in an TDD (Time Division Duplex) mode, and a number N of RVs (Redundancy Versions) of the same channel-encoded payload are bundled onto the N downlink sub-frames for transmission, and a piece of downlink allocation signaling schedules transmission of the bundled N sub-frames. Frequency-domain resources used for the bundled N sub-frames may be the same or may be different.

The technical solution of embodiments of the invention will be described clearly and fully below with reference to the drawings in the embodiments of the invention, and apparently the embodiments to be described are a part but not all of the embodiments of the invention. Any other embodiments that can occur to those ordinarily skilled in the art in view of the embodiments of the invention here without any inventive effort shall come into the scope of the invention.

Figure 1:
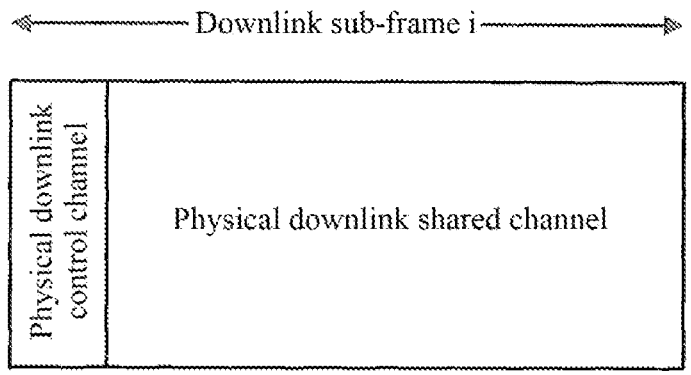
FIG. 1 is a schematic structural diagram of a downlink sub-frame in the prior art.
Figure 2:
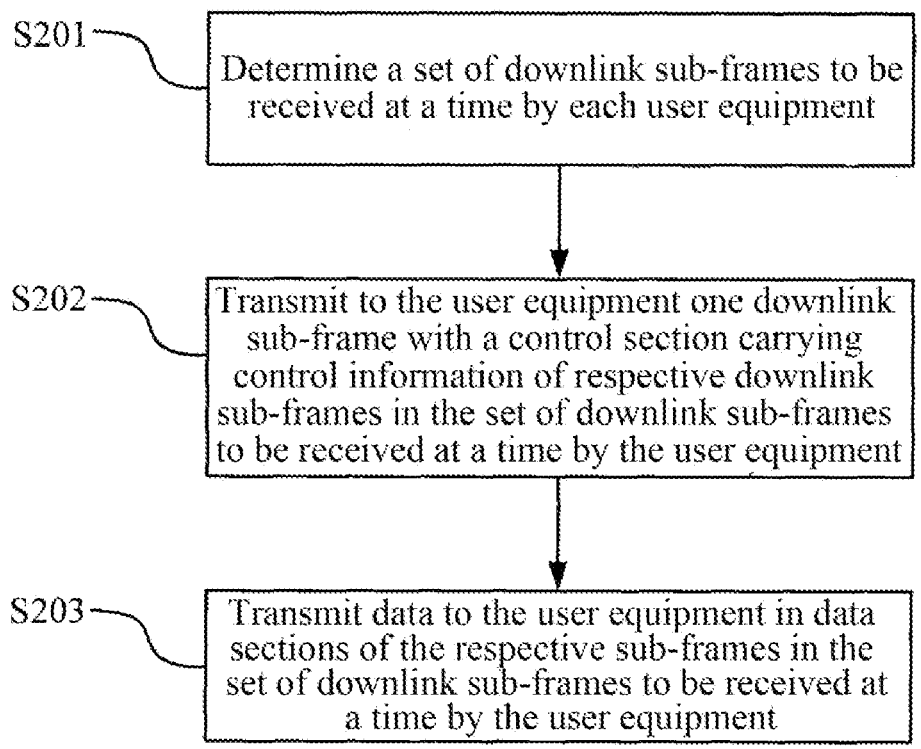
FIG. 2 is a flow chart of a method for scheduling a downlink sub-frame according to an embodiment of the invention.

As illustrated in FIG. 2 which is a schematic flow chart of a method for scheduling a downlink sub-frame according to an embodiment of the invention, the method particularly includes the following steps:

Step S201: determining a set of downlink sub-frames to be received at a time by each user equipment.

Step S202: transmitting one downlink sub-frame to the user equipment.

Particularly control information of respective downlink sub-frames in the set of downlink sub-frames to be received at a time by the user equipment is carried in a control section of the downlink sub-frame.

It shall further be noted that particularly the control information is detailed indicator information, of data sections of the respective downlink sub-frames in the set of downlink sub-frames to be received at a time by the user equipment, carried in the control section of the downlink sub-frame, and the detailed indicator information of data sections of the respective downlink sub-frames in the set of downlink sub-frames to be received at a time by the user equipment particularly includes:

a data section of one downlink sub-frame following the downlink sub-frame;

data sections of a plurality of downlink sub-frames following the downlink sub-frame; or a data section of the downlink sub-frame itself and a data section of one or more downlink sub-frames following the downlink sub-frame.

On the other hand, particularly the downlink respective sub-frames in the set of downlink sub-frames to be received at a time by the user equipment are consecutive downlink sub-frames or inconsecutive downlink sub-frames.

Furthermore payloads transmitted in the data sections of the respective downlink sub-frames in the set of downlink sub-frames to be received at a time by the user equipment are different from each other.

Step S203: transmitting data to the user equipment in data sections of the respective sub-frames in the set of downlink sub-frames to be received at a time by the user equipment.

It shall be noted after the step S202 and the step S203 are performed, the technical solution of the invention further includes a process flow at the side of the user equipment particularly as follows:

The user equipment receives the downlink sub-frame and obtains the control information, of the respective downlink sub-frames in the set of downlink sub-frames to be received at a time by the user equipment, carried in the control section of the downlink sub-frame; and The user equipments receives the data in the data sections of the respective downlink sub-frames in the corresponding set of downlink sub-frames according to the control information of the respective downlink sub-frames in the set of downlink sub-frames.

In the foregoing step S203, payloads transmitted in the respective downlink sub-frames may be the same or may be different from each other. Particularly when the set of downlink sub-frames include at least two downlink sub-frames in which the same payload is transmitted, the step S203 can further be performed in the following steps:

Firstly the same payload is channel-encoded to obtain at least two redundancy versions. Particularly a measurement result of a cell signal quality by a receiver of the payload can be received, and it is determined from the received measurement result whether it is necessary to transmit the at least two redundancy versions corresponding to the payload to the receiver. When a determination result is "YES", the same payload is channel-encoded under the same encoding rule to obtain at least two redundancy versions.

Then the at least two redundancy versions are further transmitted to the user equipment in data sections of the at least two downlink sub-frames. Particularly the at least two downlink sub-frames can be consecutive downlink sub-frames or can be inconsecutive downlink sub-frames. There is no separate control signaling for the respective sub-frames, and the different redundancy versions corresponding to the same payload are transmitted in the sub-frames.

In an embodiment of the invention, the downlink sub-frame in which the control information is carried can be a downlink sub-frame other than the at least two downlink sub-frames or can be a downlink sub-frame among the at least two downlink sub-frames.

In the embodiment of the invention, at least two downlink sub-frames are scheduled by one downlink sub-frame, making it possible to save an overhead of control signaling and to improve the flexibility of scheduling of the sub-frames; and at least two redundancy versions corresponding to the same payload are transmitted, making it possible to enhance the reliability of downlink transmission. Furthermore in the embodiment of the invention, at least two redundancy versions corresponding to the same payload are transmitted in the at least two bundled downlink sub-frame also with such a technical effect that when a receiver in an HARQ (Hybrid Auto Repeat Request) mechanism can not perform error correction according to one of the received at least two redundancy versions, it can perform the error correction according to another redundancy version corresponding to the same payload, which is suitable in the case of a low system SNR (Signal to Noise Ratio) or a poor cell edge signal.

Application scenarios of the embodiment of the invention particularly include but will not be limited to the following two scenarios:

(1) A number N (N>=2) of consecutive or inconsecutive downlink sub-frames are bundled together for transmission of at least two redundancy versions corresponding to the same payload, and a control section of a sub-frame other than the N downlink sub-frames schedules the bundled N downlink sub-frames.

(2) A number N (N>=2) of consecutive or inconsecutive downlink sub-frames are bundled together for transmission of at least two redundancy versions corresponding to the same payload, and a control section of a first sub-frame among the N downlink sub-frames schedules the bundled N downlink sub-frames.

The downlink sub-frame transmission method according to the embodiment of the invention will be described in details below in connection with the foregoing application scenarios.

Figure 3:
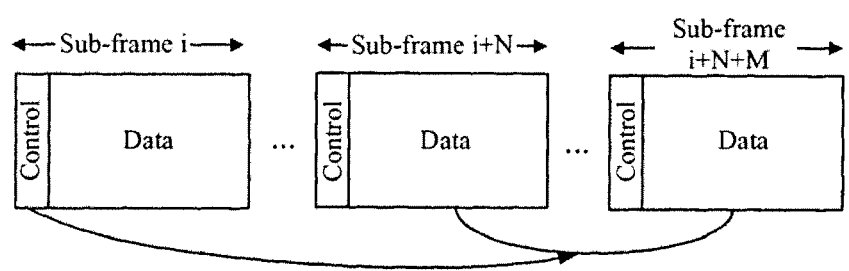
FIG. 3 is a schematic diagram of downlink sub-frame bundling according to an embodiment of the invention.

As illustrated in FIG. 3 which is a schematic diagram of downlink sub-frame binding according to an embodiment of the invention, a number (M+1) of consecutive or inconsecutive downlink sub-frames are bundled together, and a control section of a sub-frame other than the (M+1) downlink sub-frames schedules the (M+1) downlink sub-frames.

Figure 4:
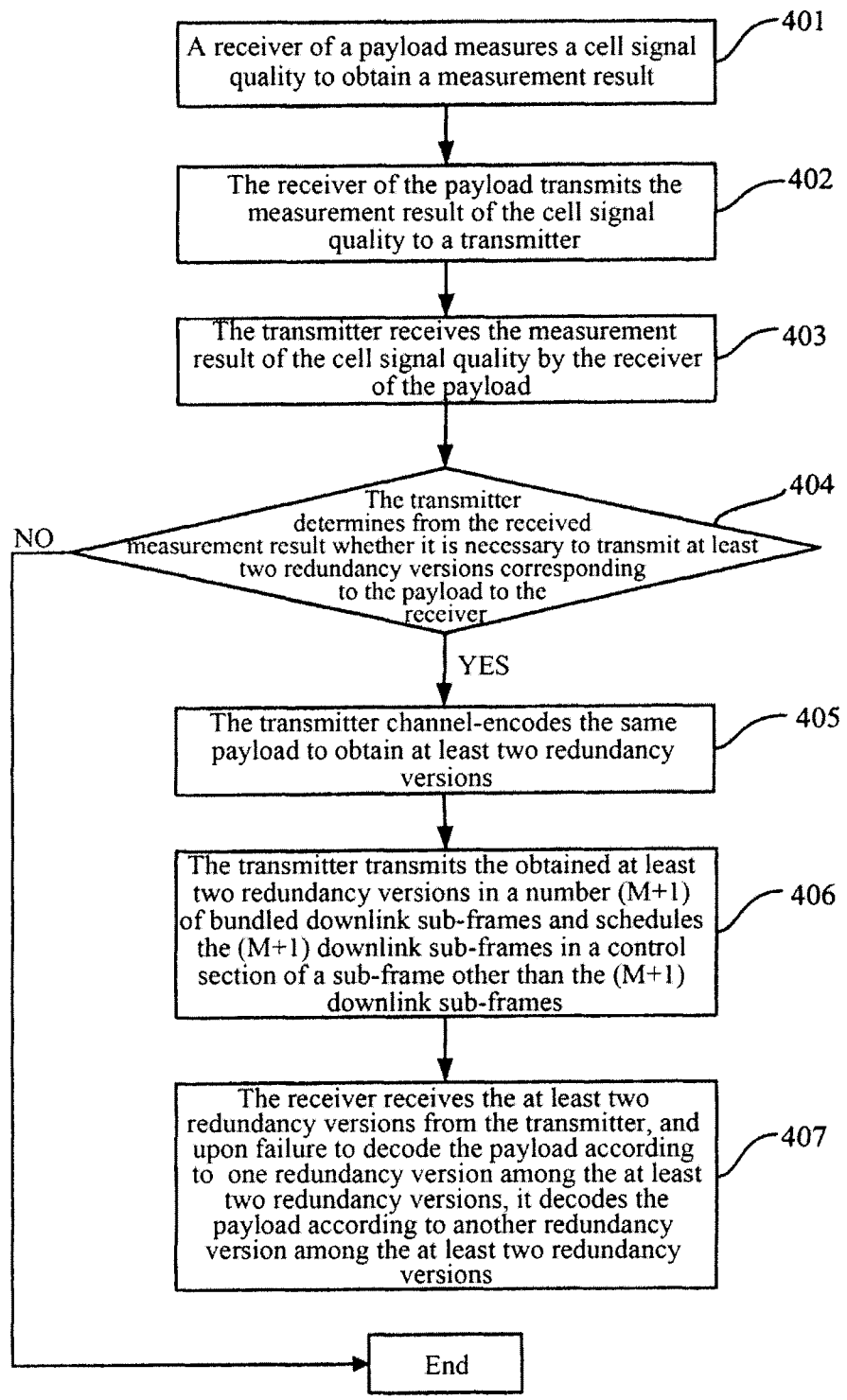
FIG. 4 is a flow chart of a signal transmission method according to an embodiment of the invention.

As illustrated in FIG. 4 which is a flow chart of a signal transmission method according to an embodiment of the invention, the method particularly includes the steps of:

In the step 401, a receiver of a payload measures cell signal quality to obtain a measurement result.

Particularly the measurement result includes cell signal strength, a system SNR and other information.

In the step 402, the receiver of the payload transmits the measurement result of the cell signal quality to a transmitter.

In the step 403, the transmitter receives the measurement result of the cell signal quality by the receiver of the payload.

In the step 404, the transmitter determines from the received measurement result whether it is necessary to transmit at least two redundancy versions corresponding to the payload to the receiver. If a determination result is "Yes", then the step 405 is performed; or if the determination result is "No", then the flow ends.

Particularly the transmitter can determine whether the cell signal strength in the measurement result is below a preset value, and if the cell signal strength is below the preset value, then it determines that there is a poor signal quality of a cell where the receiver is located and that it is necessary to transmit at least two redundancy versions corresponding to the same payload to the receiver.

The transmitter can alternatively determine whether the system SNR in the measurement result is below a preset value, and if the system SNR is below the preset value, then it determines that there is a poor signal quality of a cell where the receiver is located and that it is necessary to transmit at least two redundancy versions corresponding to the same payload to the receiver.

In the step 405, the transmitter channel-encodes the same payload to obtain at least two redundancy versions.

In the step S406, the transmitter transmits the obtained at least two redundancy versions in a number (M+1) of bundled downlink sub-frames and schedules the (M+1) downlink sub-frames in a control section of a sub-frame other than the (M+1) downlink sub-frames.

Particularly the bundled downlink sub-frames can be consecutive downlink sub-frames or can be inconsecutive downlink sub-frames. There is no separate control signaling for the respective bundled sub-frames, and the different redundancy versions corresponding to the same payload are transmitted in the sub-frames.

In the step S407, the receiver receives the at least two redundancy versions from the transmitter, and upon failure to decode the payload according to one redundancy version among the at least two redundancy versions, it decodes the payload according to another redundancy version among the at least two redundancy versions.

As compared with traditional scheduling of a single sub-frame, in the embodiment of the invention, at least two downlink sub-frames are scheduled in a piece of downlink allocation signaling, making it possible to save an overhead of control signaling and to improve the flexibility of scheduling of the sub-frames; and at least two redundancy versions corresponding to the same payload are transmitted, making it possible to enhance the reliability of downlink transmission.

Figure 5:
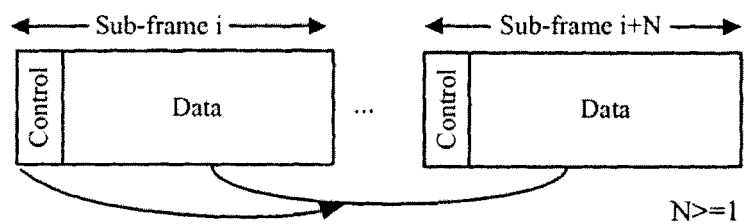
FIG. 5 is a schematic diagram of another downlink sub-frame bundling according to an embodiment of the invention.

As illustrated in FIG. 5 which is a schematic diagram of another downlink sub-frame binding according to an embodiment of the invention, a number (N+1) of consecutive or inconsecutive downlink sub-frames are bundled together, and a control section of a first sub-frame among the (N+1) downlink sub-frames schedules the (N+1) downlink sub-frames.

A signal transmission method according to an embodiment of the invention will be described in details below in connection with the foregoing application scenario.

Figure 6:
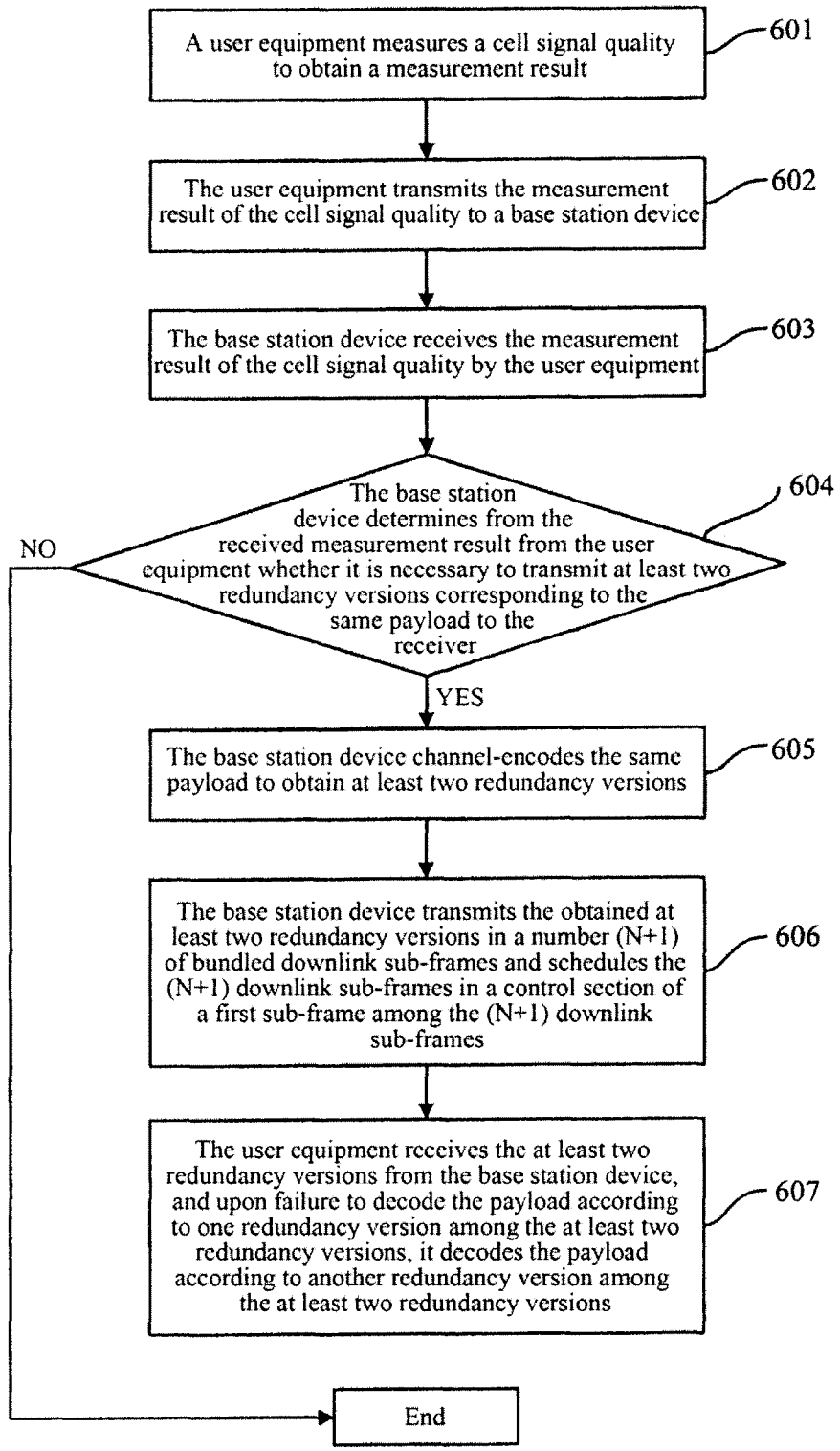
FIG. 6 is a flow chart of another signal transmission method according to an embodiment of the invention.

As illustrated in FIG. 6 which is a flow chart of another signal transmission method according to an embodiment of the invention, the method particularly includes the steps of:

In the step 601, a user equipment measures a cell signal quality to obtain a measurement result.

Particularly the measurement result includes cell signal strength, a system SNR and other information.

In the step 602, the user equipment transmits the measurement result of the cell signal quality to a base station device.

In the step 603, the base station device receives the measurement result of the cell signal quality by the user equipment.

In the step 604, the base station device determines from the received measurement result from the user equipment whether it is necessary to transmit at least two redundancy versions corresponding to the same payload to the receiver. If a determination result is "YES", then the step 605 is performed; or if the determination result is "NO", then the flow ends.

Particularly the base station device can determine whether the cell signal strength in the measurement result is below a preset value, and if the cell signal strength is below the preset value, then it determines that there is a poor signal quality of a cell where the user equipment is located and that it is necessary to transmit at least two redundancy versions corresponding to the same payload.

The base station device can alternatively determine whether the system SNR in the measurement result is below a preset value, and if the cell signal strength is below the preset value, then it determines that there is a poor signal quality of a cell where the user equipment is located and that it is necessary to transmit at least two redundancy versions corresponding to the same payload.

In the step 605, the base station device channel-encodes the same payload to obtain at least two redundancy versions.

In the step S606, the base station device transmits the obtained at least two redundancy versions in a number (N+1) of bundled downlink sub-frames and schedules the (N+1) downlink sub-frames by a control section of a first sub-frame among the (N+1) downlink sub-frames.

Particularly the bundled downlink sub-frames can be consecutive downlink sub-frames or can be inconsecutive downlink sub-frames. There is no separate control signaling for the respective bundled sub-frames, and the different redundancy versions corresponding to the same payload are transmitted in the respective bundled sub-frames.

In the step S607, the user equipment receives the at least two redundancy versions from the base station device, and upon failure to decode the payload according to one redundancy version among the at least two redundancy versions, it decodes the payload according to another redundancy version among the at least two redundancy versions.

As compared with traditional scheduling of a single sub-frame, in the embodiment of the invention, at least two downlink sub-frames are scheduled by a piece of downlink allocation signaling, making it possible to save an overhead of control signaling and to improve the flexibility of scheduling of the sub-frames; and at least two redundancy versions corresponding to the same payload are transmitted, making it possible to enhance the reliability of downlink transmission.

Furthermore the foregoing solution according to the embodiment of the invention further has the following advantages over the prior art:

With the technical solution according to the embodiment of the invention, a control section of one sub-frame schedules a data section of one or more other sub-frames, making it possible to greatly save an overhead of control signaling to thereby have more resources for transmission of data and improve the performance of a system as compared with traditional scheduling of a single downlink sub-frame.

The technical solution according to the embodiment of the invention will be further described below in connection with specific instances.

Descriptions will be given below respectively in the following several examples of specific application scenarios:

In a first example, a control section of one downlink sub-frame can schedule a data section of another downlink sub-frame.

Figure 7:
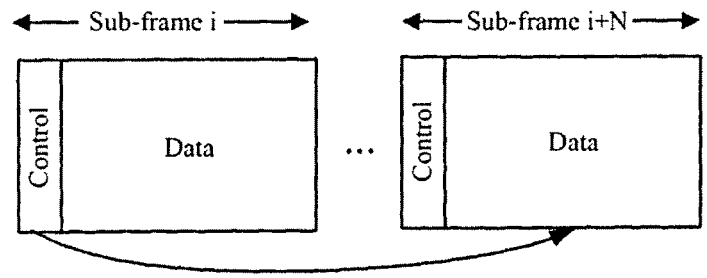
FIG. 7 is a schematic diagram of a method for scheduling a downlink sub-frame in a specific application scenario according to an embodiment of the invention.

As illustrated in FIG. 7, a control section of an $i^{th}$ sub-frame controls a data section of a $(i+N)^{th}$ sub-frame and thus can schedule the data section of the $(i+N)^{th}$ sub-frame for data transmission.

Thus the control section of the $i^{th}$ sub-frame is detected upon reception of the $i^{th}$ sub-frame, and it can be identified that a sub-frame indicated in a corresponding control indicator relates to the data section of the $(i+N)^{th}$ sub-frame.

In a second example, a control section of one downlink sub-frame can schedule data sections of a plurality of further downlink sub-frames concurrently.

Figure 8:
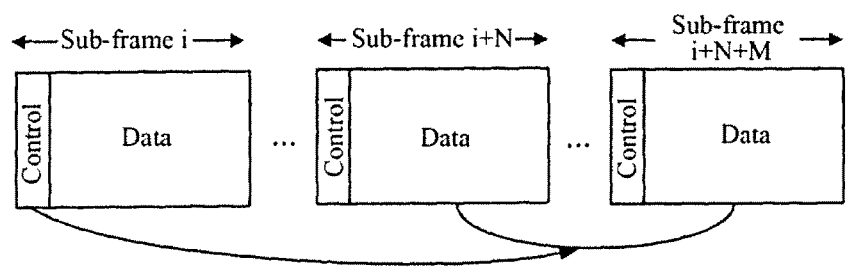
FIG. 8 is a schematic diagram of a method for scheduling a downlink sub-frame in a specific application scenario according to an embodiment of the invention.

As illustrated in FIG. 8, a control section of an $i^{th}$ sub-frame controls data sections of a $(i+N)^{th}$ sub-frame and a $(i+M)^{th}$ sub-frame and thus can schedule the data sections of the $(i+N)^{th}$ sub-frame and the $(i+M)^{th}$ sub-frame for data transmission.

Thus the control section of the $i^{th}$ sub-frame is detected upon reception of the $i^{th}$ sub-frame, and it can be identified that sub-frames indicated in a corresponding control indicator relates to the data sections of the $(i+N)^{th}$ sub-frame and the $(i+M)^{th}$ sub-frame.

In a specific application scenario, data sections of other sub-frames can be further controlled, and thus the number of sub-frames can vary without departing from the scope of the invention.

In a third example, a control section of one downlink sub-frame can schedule a data section of the downlink sub-frame and data sections of one or more further downlink sub-frames concurrently.

Figure 9:
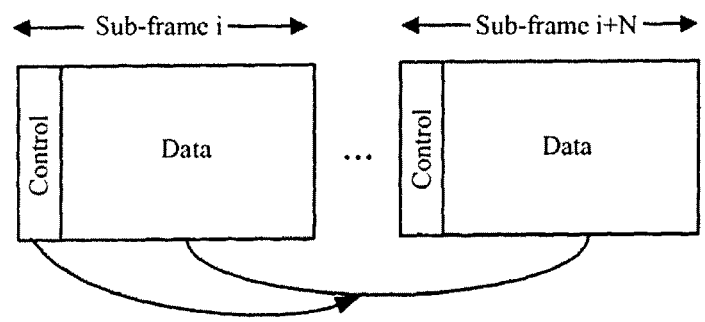
FIG. 9 is a schematic diagram of a method for scheduling a downlink sub-frame in a specific application scenario according to an embodiment of the invention.

As illustrated in FIG. 9, a control section of an $i^{th}$ sub-frame controls a data section of the $i^{th}$ sub-frame and a data section of a $(i+N)^{th}$ sub-frame and thus can schedule its own data section and the data section of a $(i+N)^{th}$ sub-frame for data transmission.

Thus the control section of the $i^{th}$ sub-frame is detected upon reception of the $i^{th}$ sub-frame, and it can be identified that sub-frames indicated in a corresponding control indicator relates to the data sections of the $i^{th}$ sub-frame and the $(i+N)^{th}$ sub-frame.

In a specific application scenario, data sections of other sub-frames can be further controlled, and thus the number of sub-frames can vary without departing from the scope of the invention.

In order to implement the foregoing technical solution, a new bit can be defined in control signaling supporting scheduling of a plurality of downlink sub-frames to indicate a specific condition of scheduled sub-frames.

The embodiment of the invention has the following advantages over the prior art:

With the technical solution according to the embodiment of the invention, a control section of one sub-frame schedules a data section of one or more other sub-frames, making it possible to greatly save an overhead of control signaling to thereby have more resources for transmission of data and improve the performance of a system as compared with traditional scheduling of a single downlink sub-frame.

Figure 10:
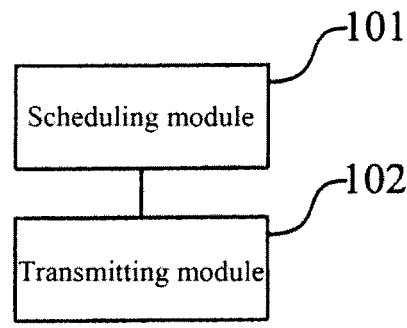
FIG. 10 is a schematic structural diagram of a base station according to an embodiment of the invention.

In order to implement the technical solution according to the embodiments of the invention, an embodiment of the invention further proposes a base station with a specific structure as schematically illustrated in FIG. 10 and particularly including:

A scheduling module 101 configured to determine a set of downlink sub-frames to be received at a time by each user equipment; and A transmitting module 102 connected with the scheduling module 101 and configured to transmit one downlink sub-frame to the user equipment, where control information of respective downlink sub-frames in the set of downlink sub-frames, to be received at a time by the user equipment, determined by the scheduling module 101 is carried in a control section of the downlink sub-frame, and to transmit data to the user equipment in data sections of the respective sub-frames in the set of downlink sub-frames to be received at a time by the user equipment.

When the set of downlink sub-frames includes at least two downlink sub-frames, in a preferred embodiments, the transmitting module 102 can particularly be divided into the following sub-modules including:

A first transmitting sub-module configured to transmit one downlink-subframe to the user equipment, where control information of the at least two downlink sub-frames, to be received at a time by the user equipment, determined by the scheduling module 101 is carried in a control section of the downlink sub-frame;

An encoding sub-module configured to channel-encode the same payload to obtain at least two redundancy versions; and A second transmitting sub-module configured to transmit the at least two redundancy versions obtained by the encoding sub-module to the user equipment in data sectors of the at least two downlink sub-frames.

Particularly the downlink sub-frame, in which the control information is carried, is a downlink sub-frame other than the at least two downlink sub-frames or among the at least two downlink sub-frames.

In a preferred embodiment, the base station can further include:

A receiving module configured to receive a measurement result of a cell signal quality by a receiver of the payload; and A determining module configured to determine from the measurement result received by the receiving module whether it is necessary to transmit the at least two redundancy versions corresponding to the payload to the receiver, and when a determination result is "Yes", to instruct the encoding sub-module to channel-encode the payload.

It shall further be noted that particularly the control information is detailed indicator information, of the data sections of the respective downlink sub-frames in the set of downlink sub-frames to be received at a time by the user equipment, carried in the control section of the downlink sub-frame, and the detailed indicator information particularly includes:

a data section of one downlink sub-frame following the downlink sub-frame;

data sections of a plurality of downlink sub-frames following the downlink sub-frame; or a data section of the downlink sub-frame itself and a data section of one or more downlink sub-frames following the downlink sub-frame.

On the other hand, particularly the respective downlink sub-frames in the set of downlink sub-frames to be received at a time by the user equipment are consecutive downlink sub-frames or inconsecutive downlink sub-frames.

Furthermore payloads transmitted in the data sections of the respective sub-frames in the set of downlink sub-frames to be received at a time by the user equipment are different from each other.

Figure 11:
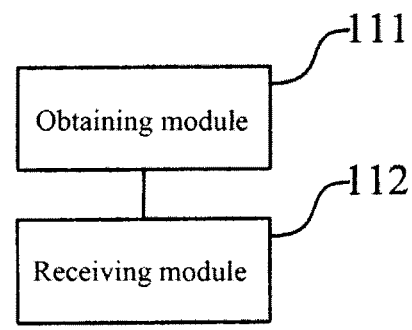
FIG. 11 is a schematic structural diagram of a user equipment according to an embodiment of the invention.

In order to implement the technical solution according to the embodiments of the invention, an embodiment of the invention further proposes a user equipment with a structure as schematically illustrated in FIG. 11 and particularly including:

An obtaining module 111 configured to obtain control information, of respective downlink sub-frames in a set of downlink sub-frames to be received at a time by the user equipment, carried in a control section of a received downlink sub-frame transmitted from a base station; and A receiving module 112 connected with the obtaining module 111 and configured to receive the downlink sub-frame transmitted from the base station and to further receive data in data sections of the respective downlink sub-frames in the corresponding set of downlink sub-frames according to the control information, of the respective downlink sub-frames in the set of downlink sub-frames, obtained by the obtaining module 111.

The embodiment of the invention has the following advantages over the prior art:

With the technical solution according to the embodiment of the invention, a control section of one sub-frame schedules a data section of one or more other sub-frames, making it possible to greatly save an overhead of control signaling to thereby have more resources for transmission of data and improve the performance of a system as compared with traditional scheduling of a single downlink sub-frame.

Figure 12:
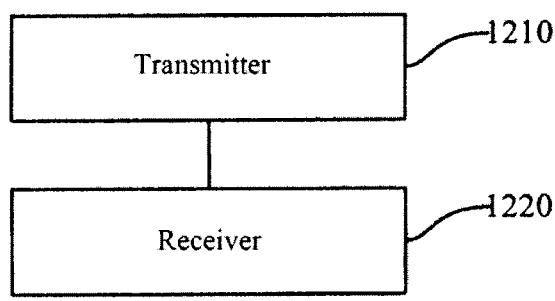
FIG. 12 is a schematic structural diagram of a signal transmission system according to an embodiment of the invention.

As illustrated in FIG. 12 which is a schematic diagram of a signal transmission system according to an embodiment of the invention, the system includes a transmitter 1210 and a receiver 1220, where:

The transmitter 1210 is configured to channel-encode the same payload to obtain at least two redundancy versions, to transmit the at least two redundancy versions in at least two downlink sub-frames, to schedule the at least two downlink sub-frames in a piece of downlink allocation signaling, and to bear a signal in the at least two downlink sub-frames.

The transmitter 1210 is further configured to channel-encode the same payload to obtain at least two redundancy versions, to transmit the at least two redundancy versions in at least two downlink sub-frames, and to schedule the at least two downlink sub-frames in a control section of a downlink sub-frame other than the at least two downlink sub-frames.

The transmitter 1210 is further configured to channel-encode the same payload to obtain at least two redundancy versions, to transmit the at least two redundancy versions in at least two downlink sub-frames, and to schedule the at least two downlink sub-frames in a control section of a downlink sub-frame among the at least two downlink sub-frames.

The receiver 1220 is configured to receive the at least two downlink sub-frames from the transmitter 1210 and to obtain the at least two redundancy versions carried in the at least two downlink sub-frames.

The receiver 1220 is further configured, upon failure to decode the payload according to one redundancy version among the at least two redundancy versions, to decode the payload according to another redundancy version among the at least two redundancy versions.

The receiver 1220 is further configured to measure a cell signal quality to obtain a measurement result and to transmit the measurement result of the cell signal quality to the transmitter 1210.

Particularly the measurement result includes cell signal strength, a system SNR and other information.

Correspondingly the transmitter 1210 is further configured to receive the measurement result from the receiver 1220, to determine from the received measurement result from the receiver 1220 whether it is necessary to transmit the at least two redundancy versions corresponding to the same payload to the receiver 1220, and if a determination result is positive, to channel-encode the same payload and obtain and transmit at least two redundancy versions corresponding to the same payload.

Particularly the transmitter 1210 can determine whether the cell signal strength in the measurement result is below a preset value, and if the cell signal strength is below the preset value, to determine that there is a poor signal quality of a cell where the receiver 1220 is located and that it is necessary to transmit at least two redundancy versions corresponding to the same payload to the receiver.

The transmitter 1210 can alternatively determine whether the system SNR in the measurement result is below a preset value, and if the system SNR is below the preset value, to determine that there is a poor signal quality of a cell where the receiver 1220 is located and that it is necessary to transmit at least two redundancy versions corresponding to the same payload to the receiver.

As compared with traditional scheduling of a single sub-frame, in the embodiment of the invention, at least two downlink sub-frames are scheduled in a piece of downlink allocation signaling, making it possible to save an overhead of control signaling and to improve the flexibility of scheduling of the sub-frames; and at least two redundancy versions corresponding to the same payload are transmitted, making it possible to enhance the reliability of downlink transmission.

From the foregoing description of the embodiments, those skilled in the art can clearly appreciate that the embodiments of the invention can be embodied in hardware or in software plus a necessary general hardware platform. Based upon such understanding, the technical solution according to the embodiments of the invention can be embodied in the form of a software product which can be stored in a nonvolatile storage medium (which may be a CD-ROM, a U disk, a mobile disk, etc.) and which includes several instructions to cause a computer device (which may be a personal computer, a server, a network device, etc.) to perform the method in the respective implementation scenarios according to the embodiments of the invention.

Those skilled in the art can appreciate that the drawings are merely schematic diagrams of preferred implementation scenarios and the modules or flows in the drawings may not necessarily be required to put the embodiments of the invention into practice.

Those skilled in the art can appreciate that the modules in the devices in the implementation scenarios can be distributed in the devices in the implementation scenarios as described in the implementation scenarios or can be correspondingly modified to be arranged in one or more devices other than those in the present implementation scenarios. The modules in the foregoing implementation scenario can be combined into one module or can be further divided into a plurality of sub-modules.

The embodiments of the invention have been numbered only for the purpose of a description, and this will not indicate superiority of one implementation scenario to another.

The foregoing disclosure is merely illustrative of several specific implementation scenarios of the embodiments of the invention, but the embodiments of the invention will not be limited thereto and any variations which can occur to those skilled in the art shall come into the scope of the invention.

The invention claimed is:

1. A method for scheduling downlink sub-frames, comprising the steps of:
   determining a set of downlink sub-frames to be received at a time by each user equipment, wherein the set of downlink sub-frames comprises at least two downlink sub-frames;
   transmitting one downlink sub-frame to the user equipment, wherein control information of respective downlink sub-frames in the set of downlink sub-frames to be received at a time by the user equipment is carried in a control section of the one downlink sub-frame; and
   transmitting data to the user equipment in data sections of the respective sub-frames in the set of downlink sub-frames to be received at a time by the user equipment;
   wherein transmitting the data to the user equipment in the data sections of the respective sub-frames in the set of downlink sub-frames to be received at a time by the user equipment comprises:
   channel-encoding a same payload to obtain at least two redundancy versions; and
   transmitting the at least two redundancy versions to the user equipment in data sections of the at least two downlink sub-frames.

2. The method according to claim 1, wherein the downlink sub-frame, in which the control information is carried, is a downlink sub-frame other than the at least two downlink sub-frames.

3. The method according to claim 1, wherein the downlink sub-frame, in which the control information is carried, is a downlink sub-frame among the at least two downlink sub-frames.

4. The method according to claim 1, wherein the method is applied in a Frequency Division Duplex, FDD, system, and the at least two downlink sub-frames are consecutive downlink sub-frames.

5. The method according to claim 1, wherein the method is applied in a Time Division Duplex, TDD, system, and the at least two downlink sub-frames are inconsecutive downlink sub-frames.

6. The method according to claim 1, wherein before the user equipment transmits the at least two redundancy versions, the method further comprises:
   receiving a measurement result of a cell signal quality by a receiver of the payload; and
   determining from the received measurement result whether it is necessary to transmit the at least two redundancy versions corresponding to the payload to the receiver.

7. The method according to claim 1, wherein the control information of the respective downlink sub-frames in the set of downlink sub-frames to be received at a time by the user equipment is carried in the control section of the downlink sub-frame by:
   carrying detailed indicator information, of the data sections of the respective downlink sub-frames in the set of downlink sub-frames to be received at a time by the user equipment, in the control section of the downlink sub-frame.

8. The method according to claim 7, wherein the detailed indicator information, of the data sections of the respective downlink sub-frames in the set of downlink sub-frames to be received at a time by the user equipment, carried in the control section of the downlink sub-frame, is:
   data sections of a plurality of downlink sub-frames following the downlink sub-frame; or
   a data section of the downlink sub-frame itself and a data section of one or more downlink sub-frames following the downlink sub-frame.

9. The method according to claim 1, wherein after transmitting one downlink sub-frame to the user equipment, the method further comprises:
   the user equipment receiving the downlink sub-frame and obtaining the control information, of the respective downlink sub-frames in the set of downlink sub-frames to be received at a time by the user equipment, carried in the control section of the downlink sub-frame; and
   the user equipment receiving the data in the data sections of the respective downlink sub-frames in the corresponding set of downlink sub-frames according to the control information of the respective downlink sub-frames in the set of downlink sub-frames.

10. A base station, comprising:
    a processor configured to determine a set of downlink sub-frames to be received at a time by each user equipment, wherein the set of downlink sub-frames comprises at least two downlink sub-frames; and
    a transmitter connected with the processor and configured to transmit one downlink sub-frame to the user equipment, wherein control information of respective downlink sub-frames in the set of downlink sub-frames, to be received at a time by the user equipment, determined by the processor is carried in a control section of the one downlink sub-frame, and the transmitter further configured to channel-encode a same payload to obtain at least two redundancy versions, and to transmit the at least two redundancy versions to the user equipment in data sections of the at least two downlink sub-frames.

11. The base station according to claim 10, wherein the downlink sub-frame, in which the control information is carried, is a downlink sub-frame other than the at least two downlink sub-frames.

12. The base station according to claim 10, wherein the downlink sub-frame, in which the control information is carried, is a downlink sub-frame among the at least two downlink sub-frames.

13. The base station according to claim 10, further comprising a receiver, wherein:
the receiver configured to receive a measurement result of a cell signal quality by the user equipment to which the payload is to be transmitted; and
the processor further configured to determine, from the measurement result received by the receiver, whether it is necessary to transmit the at least two redundancy versions corresponding to the payload to the user equipment, and when a determination result is positive, to instruct the transmitter to channel-encode the payload.

14. The base station according to claim 10, wherein the control information of the respective downlink sub-frames in the set of downlink sub-frames to be received at a time by the user equipment is carried in the control section of the downlink sub-frame by:
carrying detailed indicator information, of the data sections of the respective downlink sub-frames in the set of downlink sub-frames to be received at a time by the user equipment, in the control section of the downlink sub-frame.

15. The base station according to claim 14, wherein the detailed indicator information, of the data sections of the respective downlink sub-frames in the set of downlink sub-frames to be received at a time by the user equipment, carried in the control section of the downlink sub-frame, is:
data sections of a plurality of downlink sub-frames following the downlink sub-frame; or
a data section of the downlink sub-frame itself and a data section of one or more downlink sub-frames following the downlink sub-frame.

16. A user equipment, comprising:
a processor configured to obtain control information, of respective downlink sub-frames in a set of downlink sub-frames to be received at a time by the user equipment, carried in a control section of a downlink sub-frame transmitted from a base station, wherein the set of downlink sub-frames comprises at least two downlink sub-frames; and
a receiver connected with the processor and configured to receive the downlink sub-frame transmitted from the base station and to further receive at least two redundancy versions in data sections of the at least two downlink sub-frames in the corresponding set of downlink sub-frames according to the control information, of the respective downlink sub-frames in the set of downlink sub-frames, obtained by the processor, wherein the at least two redundancy versions are formed by channel-encoding a same payload.

* * * * *